United States Patent
Bakshi et al.

(10) Patent No.: US 12,175,307 B2
(45) Date of Patent: Dec. 24, 2024

(54) SYSTEM AND METHOD OF AUTOMATED PROCESSING FOR DYNAMIC API GENERATION

(71) Applicant: BANK OF AMERICA CORPORATION, Charlotte, NC (US)

(72) Inventors: Sakshi Bakshi, New Delhi (IN); Siva Kumar Paini, Telangana (IN); Sudhakar Balu, Chennai (IN); Srinivasa Jitendra Dhanwada, Telanagana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 30 days.

(21) Appl. No.: 17/676,577

(22) Filed: Feb. 21, 2022

(65) Prior Publication Data

US 2023/0267018 A1 Aug. 24, 2023

(51) Int. Cl.
*G06F 9/54* (2006.01)
*G06F 21/44* (2013.01)

(52) U.S. Cl.
CPC .............. *G06F 9/541* (2013.01); *G06F 21/44* (2013.01)

(58) Field of Classification Search
None
See application file for complete search history.

(56) References Cited

U.S. PATENT DOCUMENTS

| | | |
|---|---|---|
| 6,594,629 B1 | 7/2003 | Basu |
| 6,868,525 B1 | 3/2005 | Szabo |
| 6,964,023 B2 | 11/2005 | Maes |
| 7,096,185 B2 | 8/2006 | Reichardt |
| 7,263,489 B2 | 8/2007 | Cohen |
| 7,452,278 B2 | 11/2008 | Chen |
| 7,668,885 B2 | 2/2010 | Wittke |
| 7,778,831 B2 | 8/2010 | Chen |
| 8,046,778 B1 * | 10/2011 | Getlin ............... G06F 9/54 719/328 |
| 8,131,718 B2 | 3/2012 | Tran |
| 8,321,427 B2 | 11/2012 | Stampleman |
| 8,370,751 B2 | 2/2013 | Graeff |
| 8,799,417 B2 | 8/2014 | Pearce |
| 2002/0162031 A1 | 10/2002 | Levin |
| 2008/0028326 A1 | 1/2008 | Wilson |

(Continued)

FOREIGN PATENT DOCUMENTS

EP 1217610 A1 6/2002

*Primary Examiner* — Chat C Do
*Assistant Examiner* — William C Wood
(74) *Attorney, Agent, or Firm* — Moore & Van Allen PLLC; Lauren M. Stokes

(57) ABSTRACT

Various systems, methods, and computer program products are provided for dynamically generating an API. The method includes extracting metadata from a command recording of a system API. The command recording of the system includes a starting breakpoint and an ending breakpoint for one or more repetitive processes. The method also includes determining one or more API parameters for an API to be generated based on the extracted metadata. The method further includes dynamically generating the API based on the API parameters. The method still further includes causing an authentication of the credentials relating to the API via robotic process automation.

16 Claims, 7 Drawing Sheets

(56) References Cited

U.S. PATENT DOCUMENTS

| | | | |
|---|---|---|---|
| 2008/0120605 A1* | 5/2008 | Rosen | G06F 11/3624 |
| | | | 717/129 |
| 2008/0147404 A1 | 6/2008 | Liu | |
| 2008/0172610 A1 | 7/2008 | Blair | |
| 2020/0026263 A1* | 1/2020 | Haberkern | H04L 41/5022 |
| 2020/0233789 A1* | 7/2020 | Battaglia | G06F 11/3688 |
| 2021/0279115 A1* | 9/2021 | Aspro | G06F 8/30 |
| 2022/0342531 A1 | 10/2022 | Roos | |
| 2022/0342632 A1 | 10/2022 | Weinstein | |
| 2022/0345524 A1 | 10/2022 | Mitkar | |
| 2023/0122954 A1* | 4/2023 | Joshi | G06F 9/541 |
| | | | 726/4 |

\* cited by examiner

SYSTEM AND METHOD OF AUTOMATED PROCESSING FOR DYNAMIC API GENERATION

TECHNOLOGICAL FIELD

An example embodiment relates generally to API generation, and more particularly, to automated processing for dynamic API generation.

BACKGROUND

APIs are often a combination of multiple microservices that each have a specific service. Not all applications have API services, which requires generation of APIs on a case by case basis. The lack of an existing API framework puts a burden on processing power, as a new API framework is required for every new application. The increase in individual applications has made it difficult to have API services for every application and therefore it is more common for an application to not have an API framework, resulting in added burden on the processor. There exists a need for a system that can provide improved API generation.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for dynamically generating an API is provided. The system includes at least one non-transitory storage device and at least one processing device coupled to the at least one non-transitory storage device. The at least one processing device is configured to extract metadata from a command recording of a system API. The command recording of the system includes a starting breakpoint and an ending breakpoint for one or more repetitive processes. The at least one processing device is also configured to determine one or more API parameters for an API to be generated based on the extracted metadata. The at least one processing device is further configured to dynamically generate the API based on the API parameters. The at least one processing device is still further configured to cause an authentication of the credentials relating to the API via robotic process automation.

In some embodiments, the API parameters are determined based at least in part on a pre-existing API framework. In some embodiments, the at least one processing device is further configured to receive an API parameter input from a user device. In such an embodiment, the API parameter input indicates one or more API parameters of the API. In some embodiments, the at least one processing device is further configured to cause a transmission of a request for an API parameter input to a user device with the request for the API parameter input providing one or more potential changes to the API parameters and also configured to update the dynamically generated API based on a response to the request for the API parameter input.

In some embodiments, the API is generated based on previous APIs of the same type. In some embodiments, the at least one processing device is further configured to store the API to be used in a future generation of a new API. In some embodiments, the at least one processing device is further configured to cause an execution of the API in parallel to other system processes.

In another example embodiment, a computer program product for providing automatic diagnostics of API configuration. The computer program product includes at least one non-transitory computer-readable medium having computer-readable program code portions embodied therein. The computer-readable program code portions include an executable portion configured to extract metadata from a command recording of a system API. The command recording of the system includes a starting breakpoint and an ending breakpoint for one or more repetitive processes. The computer-readable program code portions also include an executable portion configured to determine one or more API parameters for an API to be generated based on the extracted metadata. The computer-readable program code portions further include an executable portion configured to dynamically generate the API based on the API parameters. The computer-readable program code portions still further include an executable portion configured to cause an authentication of the credentials relating to the API via robotic process automation.

In some embodiments, the API parameters are determined based at least in part on a pre-existing API framework. In some embodiments, the computer-readable program code portions include an executable portion configured to receive an API parameter input from a user device. In such an embodiment, the API parameter input indicates one or more API parameters of the API.

In some embodiments, the computer-readable program code portions include an executable portion configured to cause a transmission of a request for an API parameter input to a user device with the request for the API parameter input providing one or more potential changes to the API parameters and an executable portion configured to update the dynamically generated API based on a response to the request for the API parameter input.

In some embodiments, the API is generated based on previous APIs of the same type. In some embodiments, the computer-readable program code portions include an executable portion configured to store the API to be used in a future generation of a new API. In some embodiments, the computer-readable program code portions include an executable portion configured to cause an execution of the API in parallel to other system processes.

In still another example embodiment, a computer-implemented method for dynamically generating an API is provided. The method includes extracting metadata from a command recording of a system API. The command recording of the system includes a starting breakpoint and an ending breakpoint for one or more repetitive processes. The method also includes determining one or more API parameters for an API to be generated based on the extracted metadata. The method further includes dynamically generating the API based on the API parameters. The method still further includes causing an authentication of the credentials relating to the API via robotic process automation.

In some embodiments, the API parameters are determined based at least in part on a pre-existing API framework. In some embodiments, the method also includes receiving an API parameter input from a user device. In such an embodiment, the API parameter input indicates one or more API parameters of the API.

In some embodiments, the method may also include causing a transmission of a request for an API parameter input to a user device with the request for the API parameter input providing one or more potential changes to the API parameters; and updating the dynamically generated API based on a response to the request for the API parameter input.

In some embodiments, the method also includes storing the API to be used in a future generation of a new API. In some embodiments, the method also includes causing an execution of the API in parallel to other system processes.

Embodiments of the present disclosure address the above needs and/or achieve other advantages by providing apparatuses (e.g., a system, computer program product and/or other devices) and methods for automated processing for dynamic API generation. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
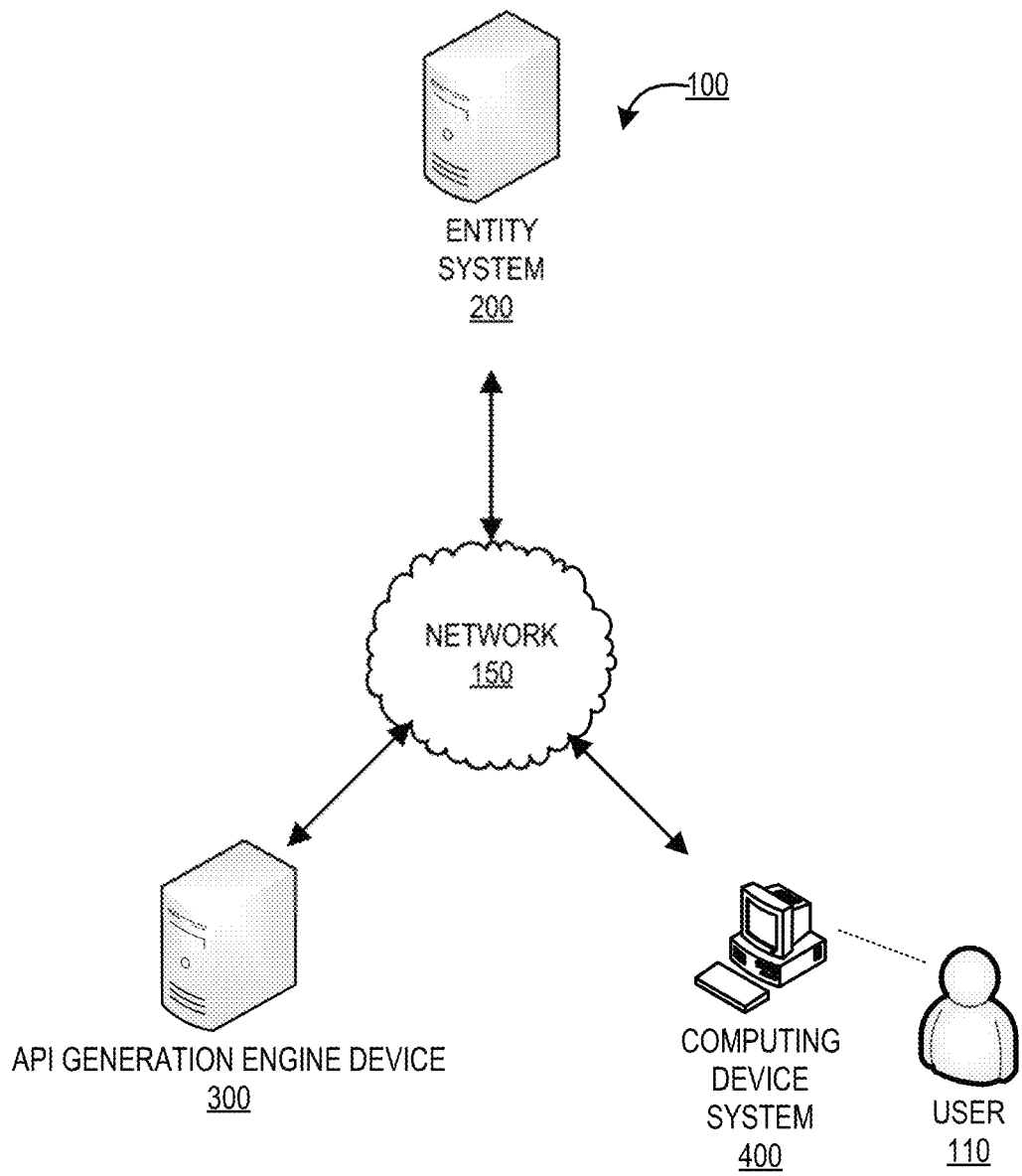
Figure 2:
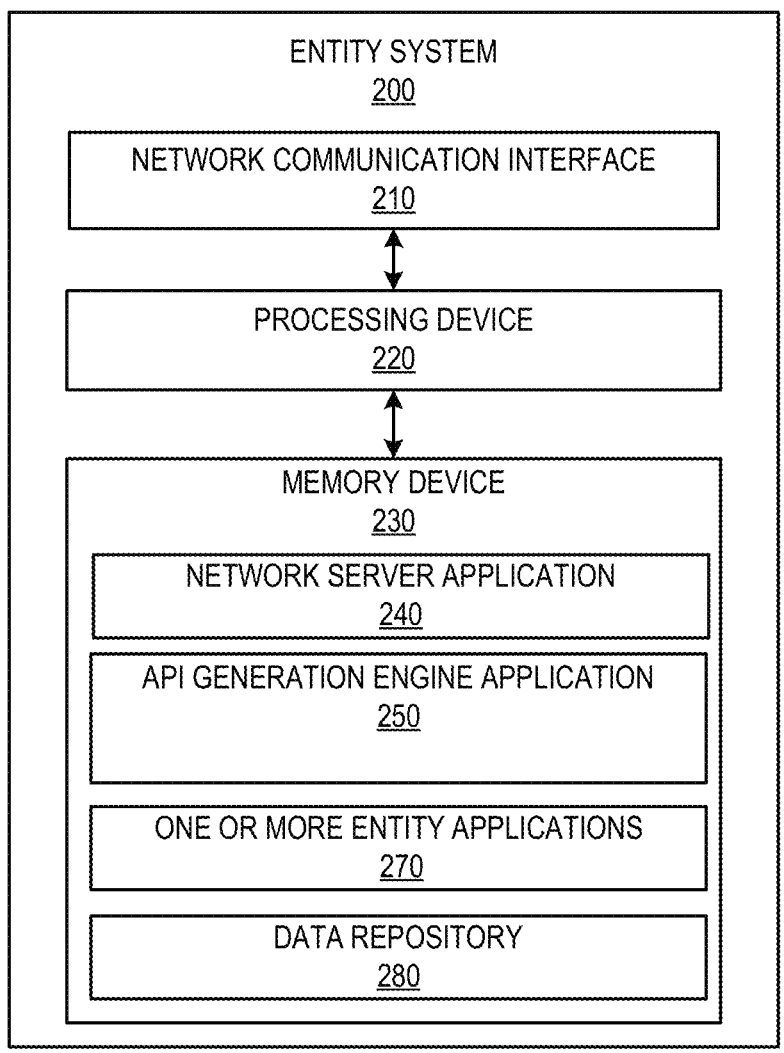
Figure 3:
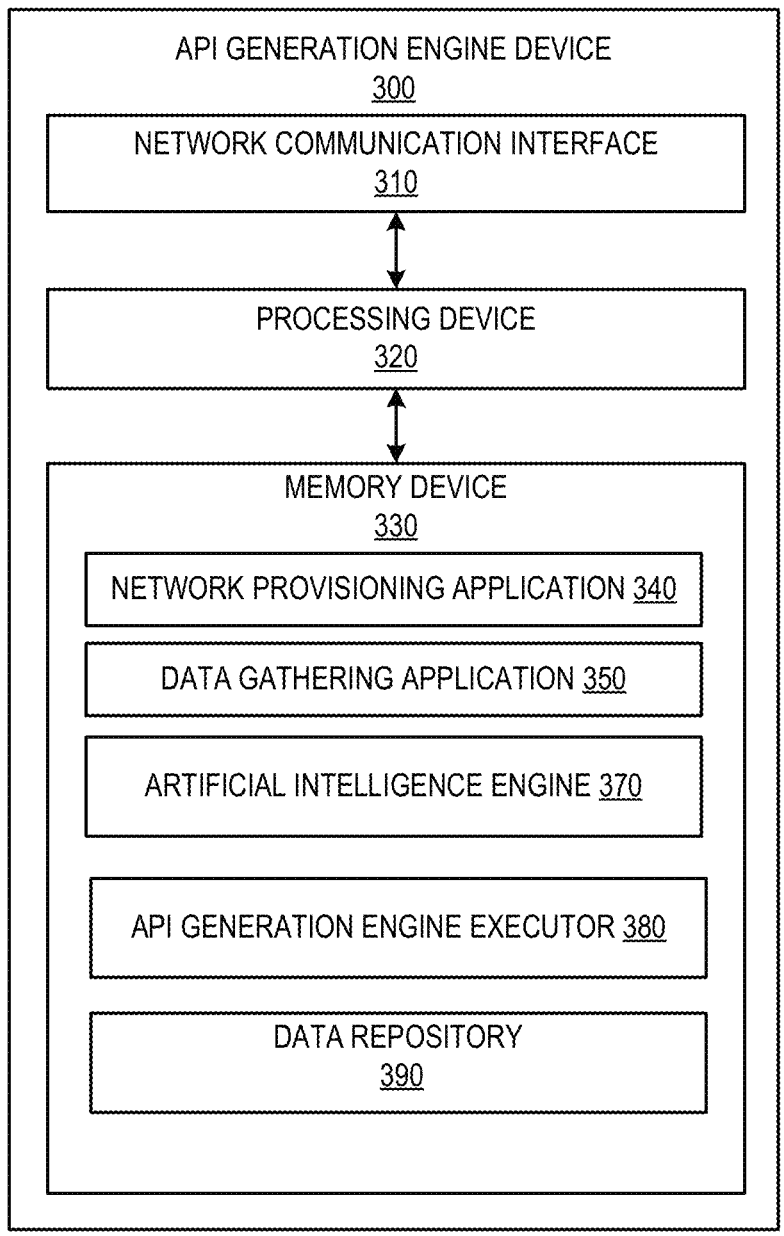
Figure 4:
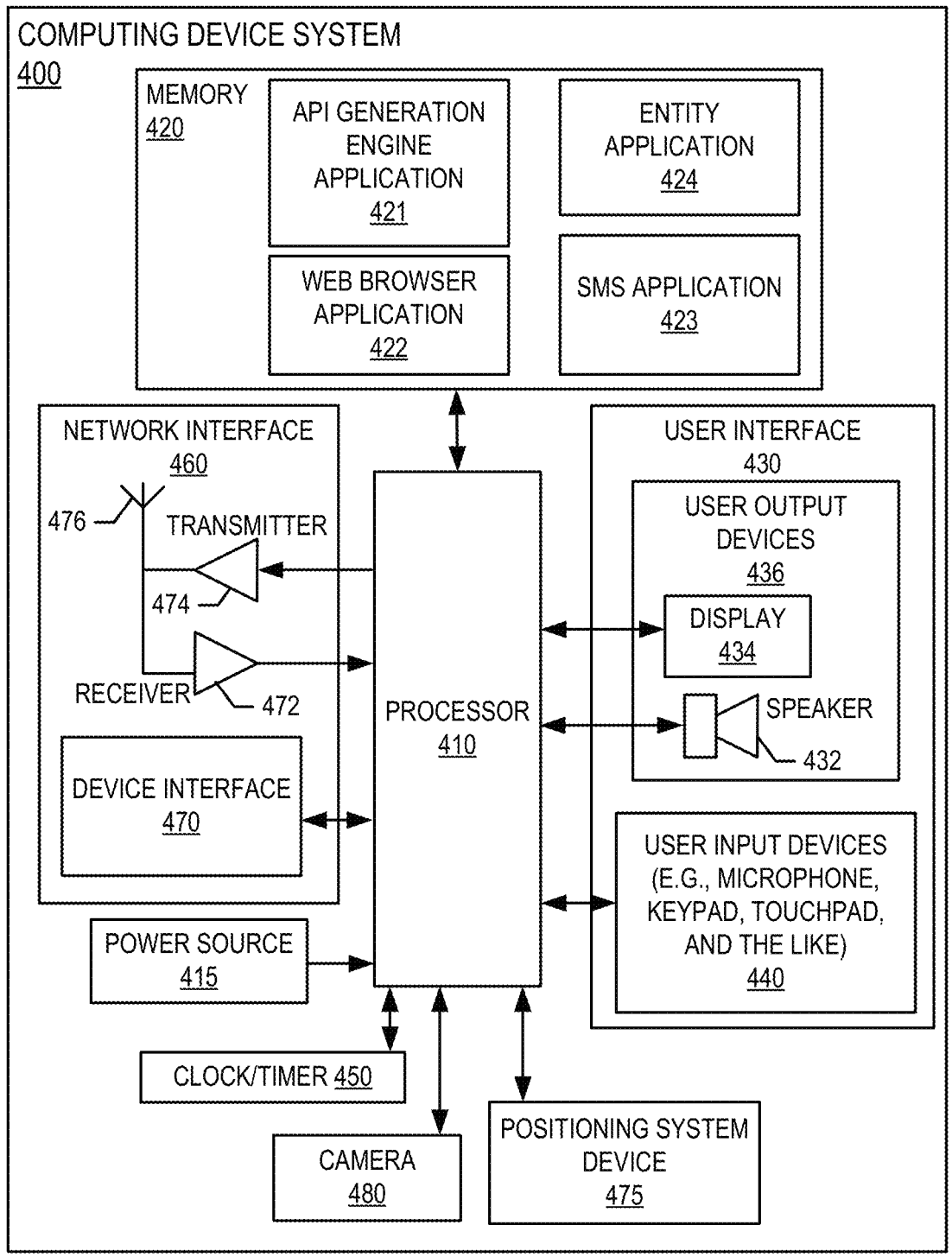
Figure 5:
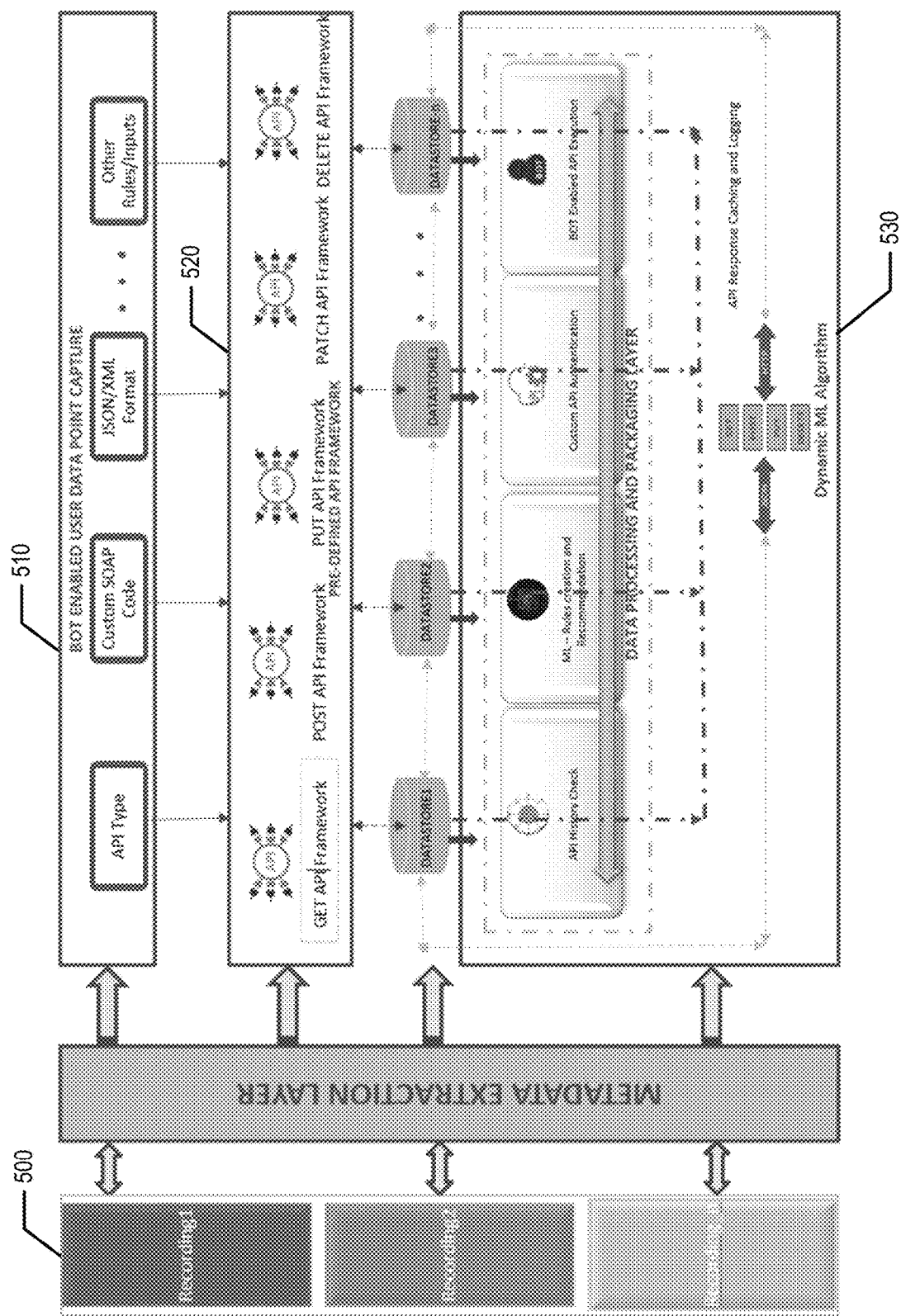
Figure 6:
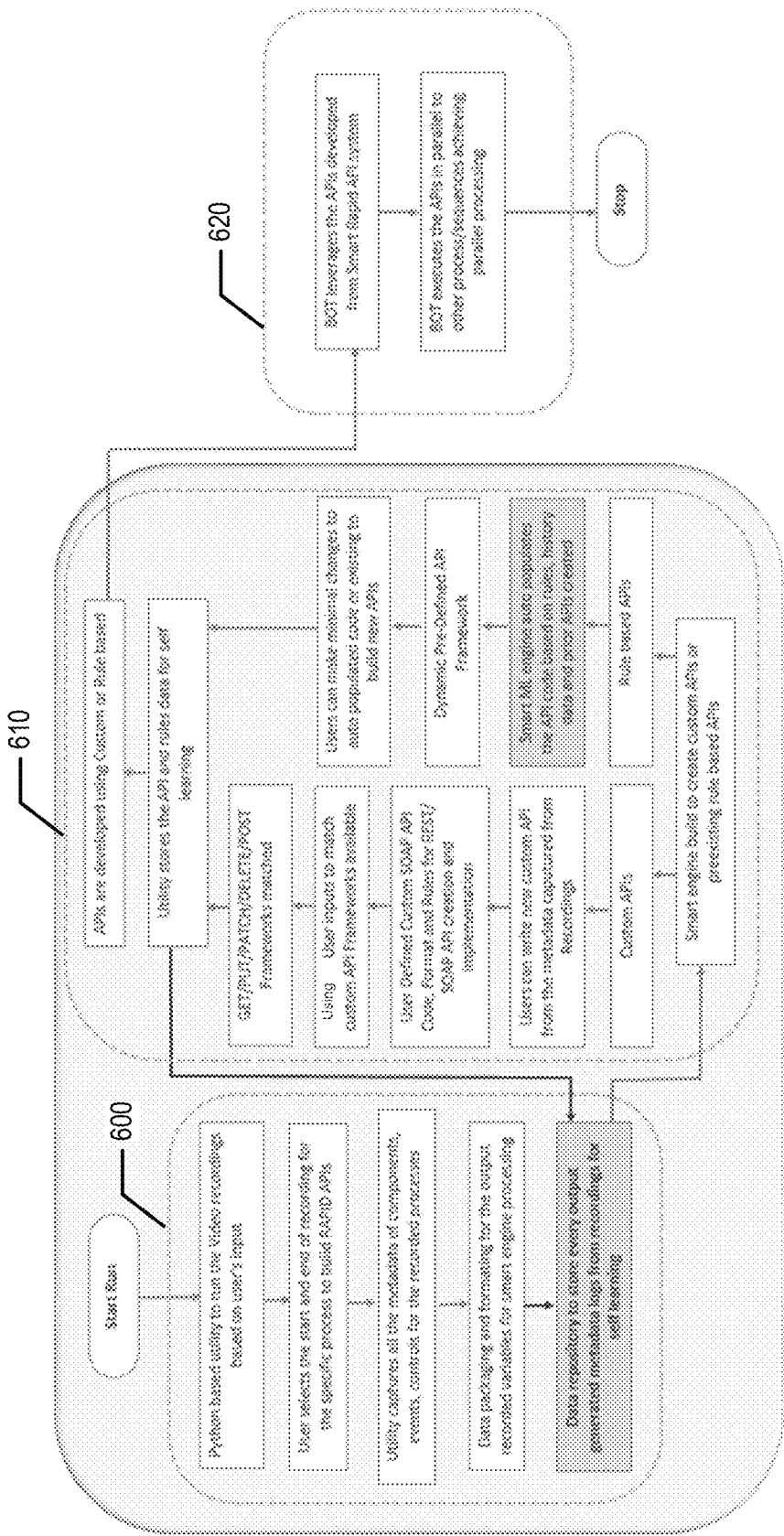
Figure 7:
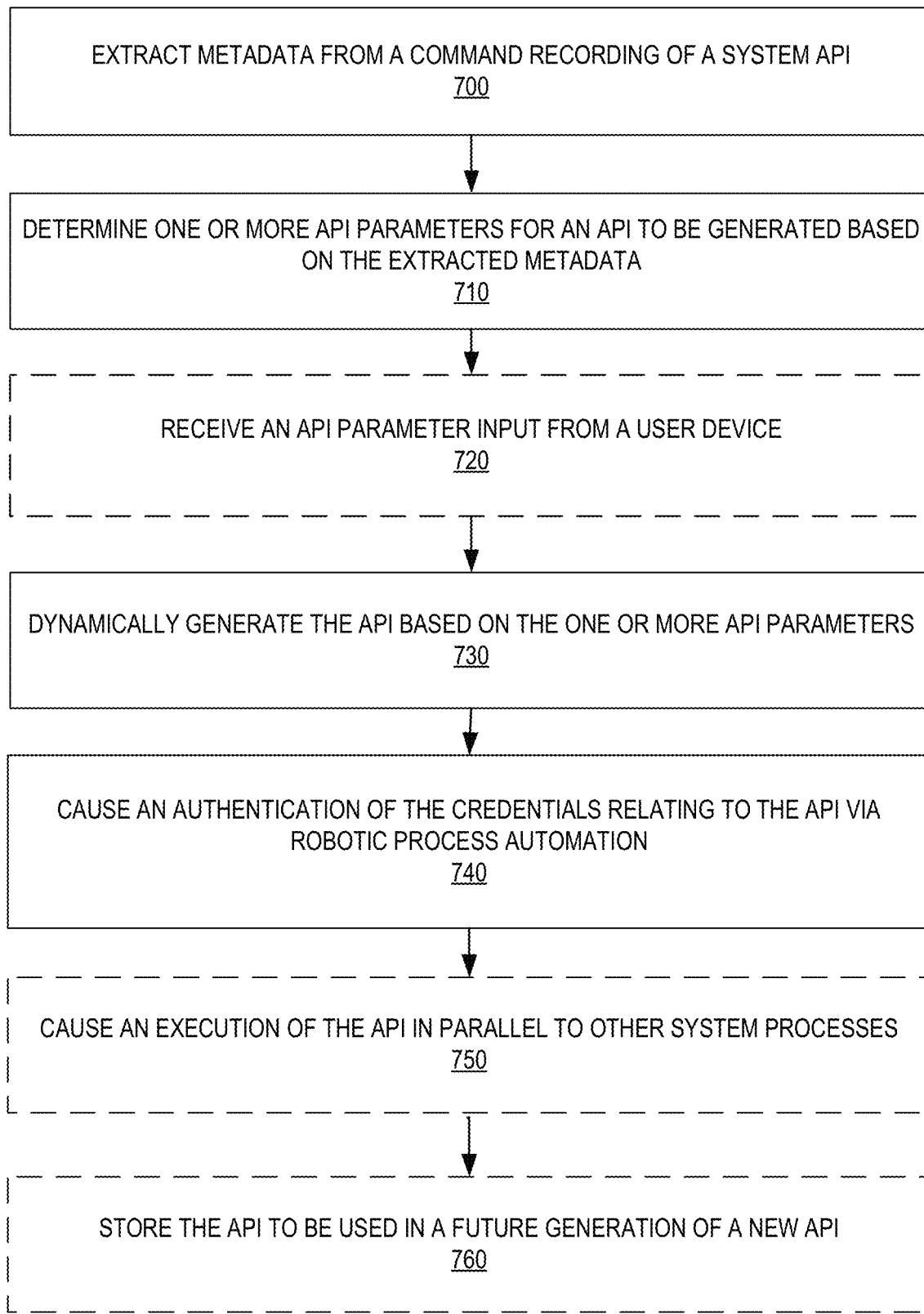

Having thus described embodiments of the disclosure in general terms, reference will now be made the accompanying drawings, wherein:

FIG. 1 provides a block diagram illustrating a system environment for automated processing for dynamic API generation, in accordance with embodiments of the present disclosure;

FIG. 2 provides a block diagram illustrating the entity system 200 of FIG. 1, in accordance with embodiments of the present disclosure;

FIG. 3 provides a block diagram illustrating an API generation engine device 300 of FIG. 1, in accordance with embodiments of the present disclosure;

FIG. 4 provides a block diagram illustrating the computing device system 400 of FIG. 1, in accordance with embodiments of the present disclosure;

FIG. 5 illustrates a diagram model of the automated processing for dynamic API generation in accordance with embodiments of the present disclosure;

FIG. 6 illustrates a process flow of dynamically generating APIs in accordance with embodiments of the present disclosure; and FIG. 7 illustrates a flow chart of the method of dynamically generating APIs in accordance with an embodiment of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Robotic process automation (RPA) relies heavily on user interfaces of applications. Often RPA processes are executed repeatedly within a workflow process. API services or frameworks are not provided for every application, which results in a heavier burden on the RPA processors, which have to develop the repeated process operations. Therefore, there exists a need to be able to reuse the repeated RPA process operations in order to reduce time and processor strain.

Various embodiments of the present disclosure provide a system for generating dynamic APIs. To generate said dynamic APIs, the system is configured to record a series of operations including metadata relating to controls, commands, and/or operations of a process. Based on the recorded operations, an API framework may be generated. In some instances, a user may also select specific workflows or the like within the API framework. The API framework is created using pre-exiting API frameworks. The automated APIs allow for RPA processors and other processors to be more efficient in operation.

To create the dynamic APIs, the system may record start and end breakpoints for any repetitive processes and captures all the information of components, elements, and controls in the process flow for the respective workflows. The captured metadata can be used to automatically build APIs and/or be used to generate custom APIs based on a user's customization settings. The system can build new rules based on existing API history and rule recommendations. The system allows the processing discussed herein to be completed independent of the RPA or other processors.

FIG. 1 provides a block diagram illustrating a system environment 100 for automated processing for dynamic API generation. As illustrated in FIG. 1, the environment 100 includes an API generation engine device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The API generation engine device 300 is a system of the present disclosure for performing one or more process steps described herein. In some embodiments, the API generation engine device 300 may be an independent system. In some embodiments, the API generation engine device 300 may be a part of the entity system 200. For example, the methods discussed herein may be carried out by the entity system 200, the API generation engine device 300, the computing device system 400, and/or a combination thereof.

The API generation engine device 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the API generation engine device 300 is configured to communicate information or instructions with the entity system 200, and/or the computing device system 400 across the network 150. While the entity system 200, the API generation engine device 300, the computing device system 400, and server device(s) are illustrated as separate components communicating via network 150, one or more of the components discussed here may be carried out via the same system (e.g., a single system may include the entity system 200 and the API generation engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the API generation engine device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an API generation engine application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the API generation engine application 250, the one or more entity application 270 to perform certain logic, data-extraction, and data-storing functions of the entity system 200 described herein, as well as communication functions of the entity system 200.

The network server application 240, the API generation engine application 250, and the one or more entity applications 270 are configured to store data in the data repository 280 or to use the data stored in the data repository 280 when communicating through the network communication interface 210 with the API generation engine device 300, and/or the computing device system 400 to perform one or more process steps described herein. In some embodiments, the entity system 200 may receive instructions from the API generation engine device 300 via the API generation engine application 250 to perform certain operations. The API generation engine application 250 may be provided by the API generation engine device 300. The one or more entity applications 270 may be any of the applications used, created, modified, facilitated, and/or managed by the entity system 200. The API generation engine application 250 may be in communication with the API generation engine device 300. In some embodiments, portions of the methods discussed herein may be carried out by the entity system 200.

FIG. 3 provides a block diagram illustrating the API generation engine device 300 in greater detail, in accordance with various embodiments.). As illustrated in FIG. 3, in one embodiment, the API generation engine device 300 includes one or more processing devices 320 operatively coupled to a network communication interface 310 and a memory device 330. In certain embodiments, the API generation engine device 300 is operated by an entity, such as a financial institution. In some embodiments, the API generation engine device 300 is owned or operated by the entity of the entity system 200. In some embodiments, the API generation engine device 300 may be an independent system. In alternate embodiments, the API generation engine device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the API generation engine device 300 described herein. For example, in one embodiment of the API generation engine device 300, the memory device 330 includes, but is not limited to, a network provisioning application 340, a data gathering application 350, an artificial intelligence engine 370, an API generation engine executor 380, and a data repository 390 comprising any data processed or accessed by one or more applications in the memory device 330. The computer-executable program code of the network provisioning application 340, the data gathering application 350, the artificial intelligence engine 370, and the API generation engine executor 380 may instruct the processing device 320 to perform certain logic, data-processing, and data-storing functions of the API generation engine device 300 described herein, as well as communication functions of the API generation engine device 300.

The network provisioning application 340, the data gathering application 350, the artificial intelligence engine 370, and the API generation engine executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the API generation engine executor 380 may store the data extracted or received from the entity system 200, and the computing device system 400 in the data repository 390. In some embodiments, the network provisioning application 340, the data gathering application 350, the artificial intelligence engine 370, and the API generation engine executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned. The computing device system 400 of various embodiments may be capable of rendering an API configuration.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an API generation engine application 421, entity application 424. These applications also typically instructions to a graphical user interface (GUI) on the display 430 that allows the user 110 to interact with the entity system 200, the API generation engine device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the API generation engine application 421 provided by the API generation engine device 300 allows the user 110 to access the API generation engine device 300. In some embodiments, the entity application 424 provided by the entity system 200 and the API generation engine application 421 allow the user 110 to access the functionalities provided by the API generation engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates a flow diagram of the operations discussed herein. As shown, one or more recordings (e.g., recordings 1, 2, n) may be collected and used for the generation of future APIs. The recordings may be metadata collected relating to any controls, commands, and/or operations of a process. As shown, the recordings 500, along with pre-existing API frameworks 520 (e.g., Pre-defined API frameworks shown) can be used to dynamically generate new APIs. Additional API parameters may also be used in generating a new API. For example, as shown in block 510, API type, custom simple object access protocol (SOAP) code, JSON/XML formatting, and/or other rules or API parameters may be determined via the metadata of the command recording and/or user input. The operations may also use machine learning models 530 to generate the new APIs. The machine learning models may be taught with the previous API frameworks and can be used as discussed in reference to FIG. 7 in generating new APIs.

FIG. 6 illustrates a process flow of dynamically generating APIs. As shown, the operations use recordings (such as those collected in FIG. 5) and the metadata of said recordings to generate the APIs dynamically. The API may be generated using a rule based or the API may be customized. The rule based API may be based on pre-existing rules based APIs (e.g., modeled after other APIs). The rule based API generation uses machine learning to generate API code based on rules, history data, and/or prior APIs generated. Users may be able to make minimal changes to the rule based API.

The blocks within box 600 can be performed by a device performing the process for which the API is to be generated. As shown, the command recording (e.g., video recordings) may be captured based on a user input (e.g., the user may input a starting breakpoint and/or an ending breakpoint). The command recording may be captured including metadata of components, events, controls, and/or the like for the recorded process. The command recording may be formatted and/or stored in a repository before being transmitted to the system for analysis and generation of the API.

Box 610 includes the operations of the API generation engine device 300 (shown in FIG. 1). As shown, the API generation engine is configured to receive the command recording from the processing device and to generate the API for the process. The API generation engine can include multiple methods of generating an API. The first, a customized API includes API parameters provided by a user. The user may provide the API parameters as discussed below in reference to Block 720 of FIG. 7. Using the customized API method, the system is configured to match the API parameters input received from the user to existing API frameworks (e.g., the input from the user can be used to select a similar pre-existing API framework to be used for the generation of the new API.

The second method of generating an API is a rule based API generation. In such an instance, the API generation engine device 300 is configured to use machine learning to determine one or more API parameters independent of user input and the API is generated without user input. The user may provide an API parameter input after the API has been generated (e.g., the API may be revised based on a user input).

The generated API (either customized or rule based) can then be stored by the API generation engine device 300 for use in future API generation. For example, as discussed below in reference to FIG. 7, the generated API may be used to teach the machine learning model (e.g., the machine learning model may use the machine learning model as a training set).

As shown in Box 620, the RPA processors (e.g., BOTS) may us the generated APIs during operations. The RPA processors are allowed to perform other processes in parallel with the APIs in order to increase processor and time efficiency. The generated API may be used the same as any other API framework.

FIG. 7 illustrates another example method of dynamically generating an API. The method may include processes similar to or the same as the method of FIGS. 7 and 8, unless otherwise noted. The method may be carried out by a system discussed herein (e.g., the entity system 200, the API generation engine device 300, the computing device system 400, and/or the local device(s) 500). An example system may include at least one non-transitory storage device and at least one processing device coupled to the at least one non-transitory storage device. In such an embodiment, the at least one processing device is configured to carry out the method discussed herein.

Referring now to Block 700 of FIG. 7, the method includes extracting metadata from a command recording of a system API. The command recording of the system includes a starting breakpoint and an ending breakpoint for one or more repetitive processes. The starting breakpoint and/or the ending breakpoint of a process may be selected by a user (e.g., a user selects the starting breakpoint and ending breakpoint for a specific process to have an API generated). Additionally or alternatively, the system may be configured to generate the starting breakpoint and/or the ending breakpoint of the process. As such, the system may be configured to record the command recording on the system during the process (e.g., between the starting breakpoint and the ending breakpoint). The command recording may include a series of steps taken during a process, as well as metadata relating to the controls, the components, and/or the elements of the process. The command recording may be stored in a file and be transmittable. As such, the device in which the command recording is recorded may transmit the command recording to the system.

Referring now to Block 710 of FIG. 7, the method includes determining one or more API parameters for an API to be generated based on the extracted metadata. Upon receiving the command recording, the system may be configured to extract the metadata that provides indications relating to the processes for which an API is to be generated. The metadata may be converted by the system into the one or more API parameters. The API parameters are determined based at least in part on a pre-existing API framework. For example, the system is configured to compare the metadata from the command recording with information relating to pre-existing API frameworks to determine similar operations. As such, one or more of the API parameters can be determined via the metadata from the command recording.

Referring now to optional Block 720 of FIG. 7, the method includes receiving an API parameter input from a user device. The API parameter input may indicate one or more of the one or more API parameters of the API. The API parameters can be determined via the metadata and/or via the API parameter input from a user device. The API parameter input allows the API generation to be customized. The API parameter input may indicate one or more API parameters desired for the API. In some embodiments, the API parameter may include selecting one or more predetermined API parameters to be used for the API. For example, the user, via the user device, may be presented with one or more options relating to the API parameters.

The system may be configured to cause a transmission of an API parameter input to a user device. The request for the API parameter input can also include one or more potential changes to the one or more API parameters and/or new API parameters. In an instance in which the API has already been generated (e.g., rules based API generation as shown in FIG. 6), the API may be dynamically updated based on a response to the request for the API parameter input. In some instances, the request for the API parameter input may be received before the API is generated (e.g., a custom API generation as shown in FIG. 6) and said response to the request can be used to determine the API parameters for the generation of the API.

Referring now to Block 730 of FIG. 7, the method includes dynamically generating the API based on the one or more API parameters. The system may use machine learning models to generate API code. The machine learning models may be configured to be trained via pre-existing API frameworks. As such, the machine learning models can be used to create an API for given processes based on the analysis of the API parameters with existing API frameworks. As such, the APIs can be generated based on previous APIs of the same type (e.g., similar or the same processes). As discussed above in reference to FIG. 6, the APIs can be generated via a customized API generation and/or a rule based API generation. The customized API generation includes receiving input from a user (e.g., an API parameter input) before generating the API and using the API parameter input at least in part to determine the API parameters for the API. The customized API generation may also use machine learning models including pre-existing API frameworks to generate the API along with the user inputted API parameters. The rules based generation uses entirely pre-existing API frameworks (including machine learning models relating to the pre-existing API frameworks). Upon generation of the rules based API, the system may request an input from a user to make changes to the generated API.

Referring now to Block 740 of FIG. 7, the method includes causing an authentication of the credentials relating to the API via robotic process automation. The system may use robotic process automation to repeat processes multiple times. Upon generation of the API, the system may use one or more RPA processors to authenticate the credentials of the API. In order to authenticate the credentials of the API, the RPA processors may cause execution of the API in parallel with other system processes to ensure that the API generated matches the metadata extracted from the command recording.

Referring now to optional Block 750 of FIG. 7, the method includes causing an execution of the API in parallel to other system processes. The automated generation of the API allows for the RPA processors to have additional processing capabilities since said RPA processors do not have to generate new APIs for each process. As such, the RPA processors may execute other RPA process flows that are distinct from the API. The amount of time to execute processes by the RPA processors is reduced by allowing the parallel processing.

Referring now to optional Block 760 of FIG. 7, the method includes storing the API to be used in a future generation of a new API. As discussed above, APIs can be generated using machine learning models that incorporate pre-existing API frameworks. Therefore, once an API is generated, it can be stored by the system for use with future generation of APIs. For example, the generated API may be provided to the machine learning model to provide additional training to the machine learning model (e.g., the generated API framework may be used as a training set by the machine learning model). Since processing steps can often be similar cross different processes, the method discussed herein allow for such similar process flows to be reused in newly generated APIs.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for dynamically generating an API, the system comprising:
   at least one non-transitory storage device; and
   at least one processing device coupled to the at least one non-transitory storage device, wherein the at least one processing device is configured to:
   extract metadata from a command recording of a system API, wherein the command recording of the system comprises a starting breakpoint and an ending breakpoint for one or more repetitive processes;
   determine one or more API parameters for the API to be generated based on the extracted metadata;
   dynamically generate the API based on the one or more API parameters;
   cause a transmission of a request for an API parameter input to a user device, wherein the request for the API parameter input provides one or more potential changes to the one or more API parameters that was determined based on the extracted metadata;
   based on a response to the request for the API parameter input, update the API,
   cause an authentication of credentials of the API via robotic process automation (RPA), wherein the authentication of credentials comprises RPA processors automatically executing the updated API and matching metadata generated from executing the updated API to the extracted metadata; and
   execute, by the RPA and in response to the authentication of the credentials, the updated API in parallel to other RPA processes distinct from the updated API.

2. The system of claim 1, wherein the one or more API parameters are determined based at least in part on a pre-existing API framework.

3. The system of claim 1, wherein the at least one processing device is further configured to receive an API parameter input from a user device, wherein the API parameter input indicates one or more of the one or more API parameters of the API.

4. The system of claim 1, wherein the API is generated based on previous APIs of the same type.

5. The system of claim 1, wherein the at least one processing device is further configured to store the API to be used in a future generation of a new API.

6. The system of claim 1, wherein the at least one processing device is configured to: train a machine learning model with a plurality of previous API frameworks; and generate, by the machine learning model, API code for the API.

7. The system of claim 6, wherein the machine learning model trained with the plurality of previous API frameworks generates the API code based on comparing the one or more API parameters with the plurality of previous API frameworks.

8. A computer program product for providing automatic diagnostics of API configuration, the computer program product comprising at least one non-transitory computer-readable medium having computer-readable program code portions embodied therein, the computer-readable program code portions comprising one or more executable portions configured to:
   extract metadata from a command recording of a system API, wherein the command recording of the system comprises a starting breakpoint and an ending breakpoint for one or more repetitive processes;
   determine one or more API parameters for the API to be generated based on the extracted metadata;
   dynamically generate the API based on the one or more API parameters;
   cause a transmission of a request for an API parameter input to a user device, wherein the request for the API parameter input provides one or more potential changes to the one or more API parameters that was determined based on the extracted metadata;
   based on a response to the request for the API parameter input, update the API,
   cause an authentication of credentials of the API via robotic process automation (RPA), wherein the authentication of credentials comprises RPA processors automatically executing the updated API and matching metadata generated from executing the updated API to the extracted metadata; and execute, by the RPA and in response to the authentication of the credentials, the updated API in parallel to other RPA processes distinct from the updated API.

9. The computer program product of claim 8, wherein the one or more API parameters are determined based at least in part on a pre-existing API framework.

10. The computer program product of claim 8, wherein the computer-readable program code portions include one or more executable portions configured to receive an API parameter input from a user device, wherein the API parameter input indicates one or more of the one or more API parameters of the API.

11. The computer program product of claim 8, wherein the API is generated based on previous APIs of the same type.

12. The computer program product of claim 8, wherein the computer-readable program code portions include one or more executable portions configured to store the API to be used in a future generation of a new API.

13. A computer-implemented method for dynamically generating an API, the method comprising:

extracting metadata from a command recording of a system API, wherein the command recording of the system comprises a starting breakpoint and an ending breakpoint for one or more repetitive processes;

determining one or more API parameters for the API to be generated based on the extracted metadata;

dynamically generating the API based on the one or more API parameters;

causing a transmission of a request for an API parameter input to a user device, wherein the request for the API parameter input provides one or more potential changes to the one or more API parameters that was determined based on the extracted metadata;

based on a response to the request for the API parameter input, updating the API, causing an authentication of credentials of the API via robotic process automation (RPA), wherein the authentication of credentials comprises RPA processors automatically executing the updated API and matching metadata generated from executing the updated API to the extracted metadata; and execute, by the RPA and in response to the authentication of the credentials, the updated API in parallel to other RPA processes distinct from the updated API.

14. The method of claim 13, wherein the one or more API parameters are determined based at least in part on a pre-existing API framework.

15. The method of claim 13, further comprising receiving an API parameter input from a user device, wherein the API parameter input indicates one or more of the one or more API parameters of the API.

16. The method of claim 13, further comprising storing the API to be used in a future generation of a new API.

\* \* \* \* \*